May 19, 1931.   J. G. DE KATER   1,806,013
MACHINE FOR SAWING UNDER WATER
Filed Jan. 24, 1930   4 Sheets-Sheet 1

May 19, 1931.    J. G. DE KATER    1,806,013
MACHINE FOR SAWING UNDER WATER
Filed Jan. 24, 1930    4 Sheets-Sheet 2

Inventor:
Jacobus Groeneveld de Kater
By
Pennie Davis Marvin & Edmonds
attorneys May 19, 1931.  J. G. DE KATER  1,806,013
MACHINE FOR SAWING UNDER WATER
Filed Jan. 24, 1930   4 Sheets-Sheet 3

Inventor:
Jacobus Groeneveld de Kater
By
Pennie Davis Marvin + Edmonds
attorneys

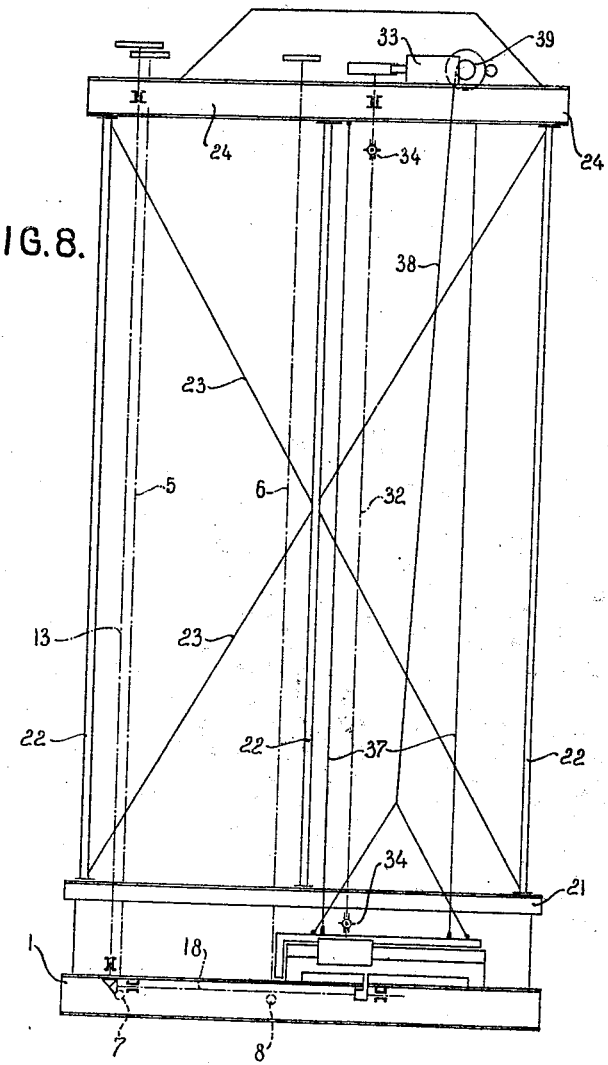

Patented May 19, 1931

1,806,013

UNITED STATES PATENT OFFICE

JACOBUS GROENEVELD DE KATER, OF THE HAGUE, NETHERLANDS

MACHINE FOR SAWING UNDER WATER

Application filed January 24, 1930, Serial No. 423,082, and in Germany December 31, 1928.

The present invention relates to a machine for sawing off under water iron sheet piles, and the like. A machine in accordance with the invention comprises essentially a bow saw which, by means of a support, can perform in an approximately horizontal plane both a sawing movement as well as a forward feed movement, and together with the support is carried by a U-shaped frame provided with a fixing device. The frame can be clamped for example on the sheet piling, or the like, underneath the saw cut plane, so that the frame and the object being worked on then form a rigid whole and the saw has a firm guide. The machine may be suspended by means of a framework from an upper frame, and this latter can carry above the water, the motor, the bearings for the driving and controlling shafts as well as a small windlass for raising and lowering the saw bow.

The accompanying drawings show, by way of example, a machine according to the invention.

Figure 8 is a diagrammatic representation of the machine and of the supporting frame.

Figure 9 shows the manner in which a pile wall is cut through stepwise.

Figure 1:
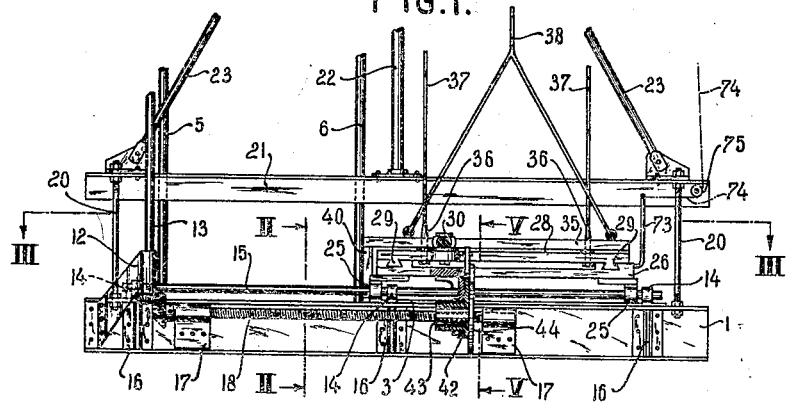
Figure 1 is a side view and a section on the line I—I of Figure 3.
Figure 2:
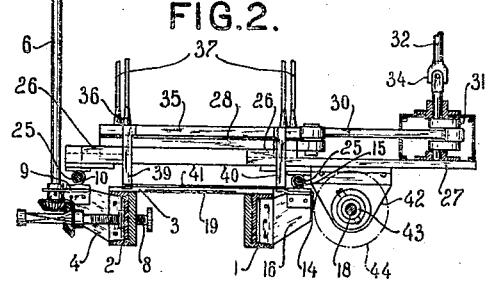
Figure 2 is a section on line II—II of Figure 1.

The frame for the bow saw consists of two parallel beams 1 and 2, which by means of a heavy cross piece 3 are interconnected to form a rigid U-shaped structure. On the beam 2 are fitted brackets for the bearings of the upright shafts 5 and 6 which serve for the rotation of the clamping screws 7 and 8. The brackets 4 carry bearings 9 for the bridle rod 10 which is fixed in a third bearing 9 provided on the bracket 11.

The beam 1 is provided with a bracket 12 on which is fastened the bearing for the shaft 13 to be rotated by hand and the bearing 14 of the bridle rod 15. Brackets 16 are fixed to the frame and each also carries a bearing 14 for the bridle rod 15.

The bridle rods 10 and 15 are parallel to each other and serve to guide the support for the saw proper.

Two brackets 17 are each provided with a bearing for the control spindle 18, by means of which the said support can be shifted either by hand (by means of the spindle 13) or by means of an automatic feed gear.

A strip 19 is secured to the cross connecting piece 3. When the saw is in its initial position, this strip projects slightly forward so that on the lowering or raising of the machine along a sheet pile, the saw blade is protected from damage.

The four long bolts 20 connect the lower frame 1, 2, 3 with two parallel angle irons 21, which are each connected by a light framework of compression bars 22 and tension bars 23 (Figure 8) with the upper frame 24. There are two such frameworks which are so connected with each other that a U-shaped space in horizontal section is left above the gap of the lower frame to receive the part of the pile wall to be cut.

The upper frame 24 is covered with boards to form a floor for the workmen and can be supported on beams to be attached to the pile wall or may be suspended from a hoisting gear.

On the bridle rods 10 and 15 rests with four guide eyes 25, the bed carriage 26 of a compound slide rest, said carriage consisting of a U-shaped part with the arm shaped extension 27. The U-shaped cross carriage 28 can be moved to and fro on guides 29 arranged on the bed carriage 26, and is driven by means of the driving rod 30, crank 31, the shaft 32 provided with the universal joint 34, and the motor 33.

Finally, the cross carriage 28 carries the U-shaped saw bow 35. For this purpose the cross carriage is provided with four heavy set pins 36 which are tapered in upward direction and pass into tensioned wire ropes 37. The saw bow 35 can be raised above the water by means of the wire ropes 38 and the windlass 39 (Figure 8) for example, when the saw has to be inspected, or is to be replaced by a fresh one. On lowering, the bow 35 comes to rest with certainty in the correct position on the cross carriage 28.

The saw bow 35 is provided at the ends of its limbs with downwardly projecting arms 39 and 40 between which is tensioned the saw blade 41.

The bed carriage 26 carries a part 42 firmly fixed thereon which encircles a sleeve 45 and is held in place against the flange thereof by a collar in such a manner that sleeve 45 is free to rotate therein. The sleeve 45 in turn encircles a nut 43 on the control shaft 18. The feed wheel 44 is rigidly secured to this nut 43. The nut 43 is surrounded by the swinging sleeve 45, which is integral with the flat swinging lever 46 and rotatable in the part 42. The swinging lever is connected by means of the driving rod 47 with the cross carriage 28, so that in operation the end of the lever 46 makes the full saw stroke.

The swinging lever 46 furthermore carries two oppositely arranged spring loaded pawls 48 and 49 which are rotatable about the pins 50 and 51.

The part 42 has a pin 52 about which the pawl 53 is rotatable. The latter is operatively coupled with the pawl 49, which carries in a fork 54 the finger 56 passed through the eye 55 of the pawl 53. The bottom of the fork 54 is so formed and the spring 57 acts on the finger 56 and on the pawl 49 in such manner that when the latter is raised, the pawl 53 engages the feed wheel 44.

In normal operation the pin 58, which is slidably mounted in the part 42, projects so far forward that the pawl 49 for a part of its stroke from the left to the right (Figure 5) is carried by its under surface over this pin and brought out of engagement with the feed wheel 44. When the pawl 49 is released in this manner, the pawl 53 engages with the feed wheel 44. With the movement of the lever 46 from left to right, the pawl 48 rotates the wheel 44 and with it the nut 43 through a certain angular distance. As on the return movement of the lever 46 from right to left, the pawl 49 is at first still released, the wheel 44 is held by the pawl 53 until the pawl 49 has moved sufficiently far to the left again in order to slide off the pin 58 and drop into a tooth gap of the wheel 44. Then, however, the pawl 53 is also again released and the wheel 44 is moved backwards over only a part of the above-mentioned angular distance. The saw is thus relieved of load. If the pin 58 is retracted, so that the pawl 49 can no longer slide over it, the pawl 53 remains released and the pawls 48 and 49 move the wheel 44 backwards and forwards over equal angular distances so that no forward feed of the saw takes place.

Figure 6:
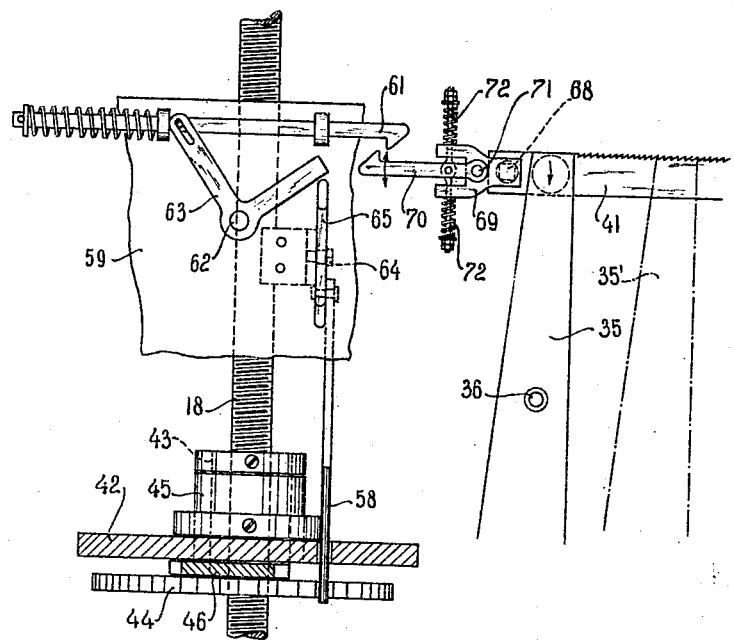
Figure 6 is a plan.
Figure 7:
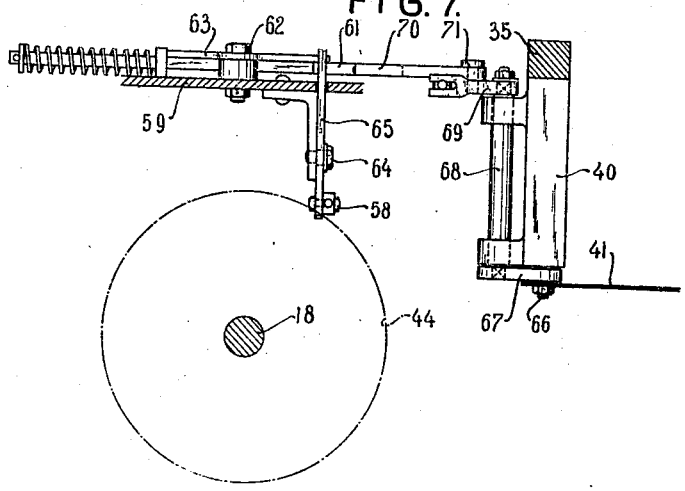
Figure 7 is a front view of the safety device, the object of which is to prevent an excessive forward feed.

The pin 58 is adapted to be actuated by the device according to Figures 6 and 7. On a plate 60 connected to the bed carriage 26 is fastened a plate 59 which consequently follows the forward feed movement of the saw 41 and of the bed carriage. On this plate 59 is slidably mounted the spring loaded hook 61. The bell crank lever 63 connected to the hook 61 and rotatable about the pin 62 acts on the lever 65, which is rotatable about the pin 64. To the lower end of the lever 65 is connected the rod or pin 58.

The saw blade 41 is connected by means of the bolt 66 serving as a crank pin and the crank 67 to the shaft 68 mounted in bearings of the arm 40. This shaft 68 has at its upper end the fork-shaped crank 69 which carries the hook 70 by means of the pin 71. This hook is normally held in its central position by means of springs 72.

When the saw is too heavily loaded either by its teeth becoming blunt or by excessive resistance offered by the material to be cut through, the saw 41 can force the bolt 66 backward (Figure 6). The saw bow 35 is not so rigid but that the saw is in a position to slightly rotate the crank 67. The hook 70 which in its movement to the left can yield under the action of the spring 72 and slide over the hook 61, will then in its stroke from left to right, engage the hook 61, whereby the pin 58 is drawn out of the path of the pawl 49 and the forward feed movement ceases. Only when the hook 70 again runs free of the hook 61, will the wheel 44 again perform its intermittent feed motion.

Figure 5:
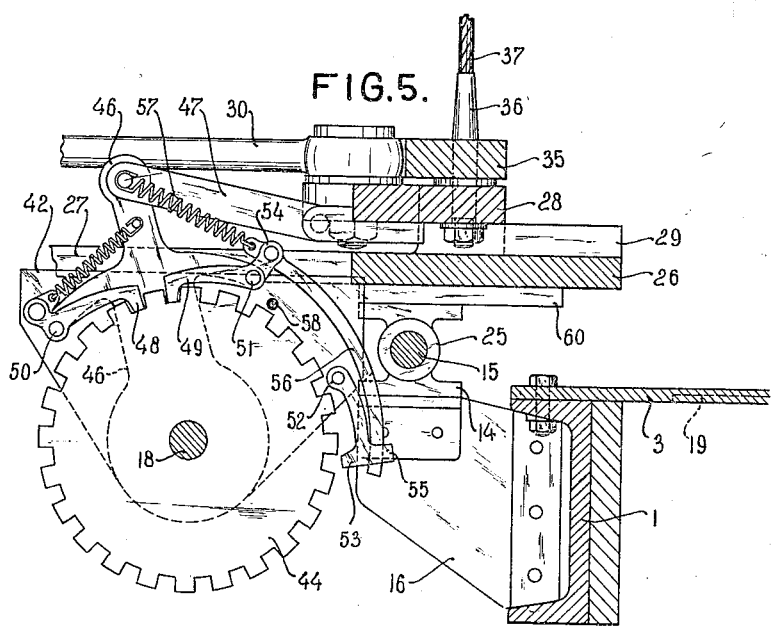

The feeding device according to Figure 5 therefore prevents the saw blade from being overloaded during the forward feed motion and is always relieved of load on the return stroke.

The control spindle 18 is stationary during the sawing, and the nut 43 is intermittently rotated in feed direction. When after the completion of the cut the bed carriage 26 is to be moved back, the spindle 13 is rotated by hand.

Figure 3:
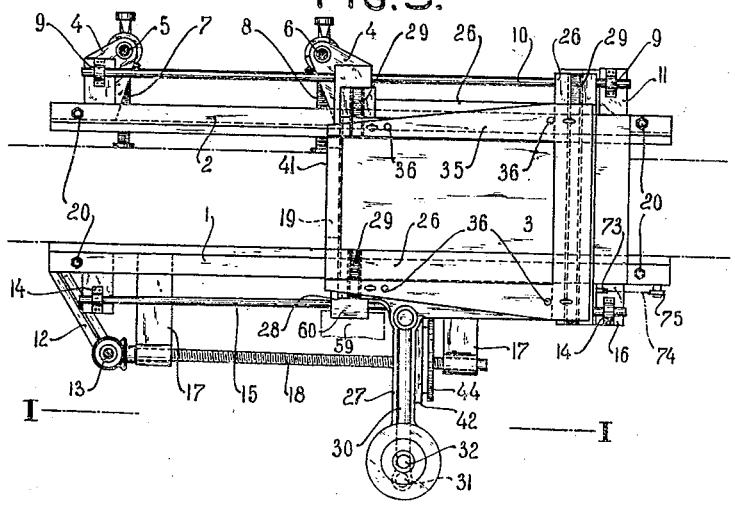
Figure 3 is a plan and a horizontal section on the line III—III of Figure 1.
Figure 4:
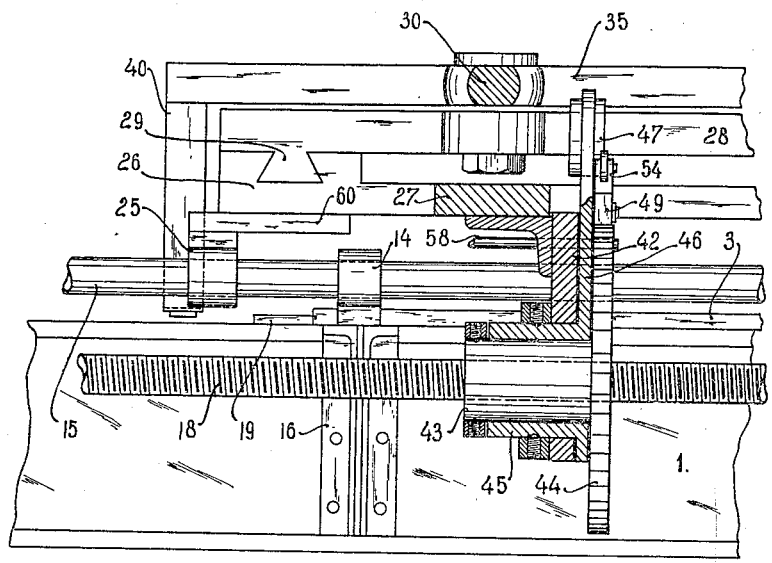
Figures 4 and 5 are two views or sections of the forward feed device on a larger scale, Figure 5 being a section on the line V—V in Figure 1.

With the bed carriage 26 is connected an upright rod 73 (Figures 1 and 3) to which is fastened a wire rope 74 passed over a disc 75. This rope 74 is fixed to an indicator on the upper frame 24 so as to always indicate the position of the saw with respect to the bridle rods 10 and 15.

Particularly in cutting through pile walls it has been proved advisable to give the guides and thus the frame 1, 2, 3 a slight inclination. The successive cuts are then arranged as shown in Figure 9. The last cut 76 cutting through the piles 78 and 79, ends at 77, and penetrates so deeply into the pile 80 that the tongues are also cut through so that the upper ends of the piles 78 and 79 can be removed. After the bed carriage is fully moved back by rotating the spindle 13 and the saw 41 is retracted so far that the strip 19 protects the saw from damage, the whole arrangement is shifted to the left (Figure 9) until the strip 19 engages the edge of the pile 80. The clamping screws 7 and 8 or at least one of them is then again tightened up and the spindle 32 is driven whereby the saw is started and the cut 81 is commenced. As the guide rods 10, 15 are slightly inclined, the saw blade cannot enter into the previous cut 77 and any danger of the saw breaking is done away with.

What I claim is:—

1. In a machine for sawing off an element such as a sheet piling below the water level, the combination with a frame being U-shaped in horizontal section, of guide ways secured to and extending in substantially parallel relation with the legs of said U, a carriage adapted for lengthwise movement along said guide ways, means for imparting lengthwise forward movement to said carriage, a saw associated with said carriage but adapted to move in transverse direction relative thereto, means for imparting to said saw reciprocatory transverse movement relative to said carriage, means for vertically moving said saw relative to said carriage, and means associated with said frame for clamping the same below the plane of movement of said saw to said element when horizontally straddled by said frame.

2. In a machine for sawing off an element such as a sheet piling below the water level, the combination with a frame being U-shaped in horizontal section, of guide ways secured to and extending in substantially parallel relation with the legs of said U, a carriage adapted for lengthwise movement along said guide ways, means for imparting lengthwise forward movement to said carriage, a support associated with said carriage but adapted to move in transverse direction relative thereto, a substantially horizontal saw bow, a saw blade tensioned in said saw bow and extending across the space between the legs of said U, means for locking said saw bow in place and the said support, means for imparting to said support reciprocatory transverse movement relative to said carriage, and means associated with said frame for clamping the same below the plane of movement of said saw to said element when horizontally straddled by said frame.

3. In a machine for sawing off an element such as a sheet piling below the water level, the combination with a frame being U-shaped in horizontal section, of guide ways secured to and extending in substantially parallel relation with the legs of said U, a carriage adapted for lengthwise movement along said guide ways, means for imparting lengthwise forward movement to said carriage, a support associated with said carriage but adapted to move in transverse direction relative thereto, a substantially horizontal saw bow, a saw blade tensioned in said saw bow and extending across the space between the legs of said U, means for locking said saw bow in place on the said support, means for raising said saw bow off said support and for lowering it into locking position thereon, means for imparting to said support reciprocatory transverse movement relative to said carriage, and means associated with said frame for clamping the same below the plane of movement of said saw to said element when horizontally straddled by said frame.

4. In a machine for sawing off an element such as a sheet piling below the water level, the combination with a structure comprising an upper frame and a lower frame suitably braced together and being U-shaped in horizontal section, of guide ways secured to and extending in substantially parallel relation with the legs of the said lower frame, a carriage adapted for lengthwise movement along said guide ways, means for imparting lengthwise forward movement to said carriage, a support associated with said carriage but adapted to move in transverse direction relative thereto, a substantially horizontal saw bow, a saw blade tensioned in said saw bow and extending across the space between the legs of said U, holes in the said saw bow, upright guiding elements extending between the said support and the said upper frame and passing through said holes, means for raising said saw bow off said support and for lowering it into locking position thereon, means for imparting to said support reciprocatory transverse movement relative to said carriage, and means associated with said frame for clamping the same below the plane of movement of said saw to said element when horizontally straddled by said frame.

5. In a machine for sawing off an element such as a sheet piling below the water level, the combination with a frame being U-shaped in horizontal section, of guide ways secured to and extending in substantially parallel relation with the legs of said U, a carriage adapted for lengthwise movement along said guide ways, means for imparting lengthwise forward movement to said carriage, a saw bow associated with said carriage but adapted to move in transverse direction relative thereto, a saw blade extending across the space between the legs of said U and having one of its ends secured to one leg of said saw bow, an arm associated with and adapted for substantially horizontal swinging movement relative to the other leg of said bow and connected to the other end of said saw blade, means cooperating with the said arm and with the said lengthwise forward movement imparting means to render said forward movement imparting means inoperative when the saw blade yields backwards to an excessive extent, means for imparting to said saw bow reciprocatory transverse movement relative to said carriage, and means associated with said frame for clamping the same below the plane of movement of said saw to said element when horizontally straddled by said frame.

6. In a machine for sawing off an element such as a sheet piling below the water level, the combination with a frame being U-shaped in horizontal section, of guide ways secured to and extending in substantially parallel relation with the legs of said U, a carriage adapted for lengthwise movement along said guide ways, a saw associated with said carriage but adapted to move in transverse direction relative thereto, means for imparting to said saw reciprocatory transverse movement relative to said carriage, a feed screw associated with said frame and extending in parallel relation with said guide ways, means normally preventing said feed screw from rotation, a nut in operative engagement with said feed screw and engaging said carriage, a ratchet device for imparting intermittent rotary motion to said nut and thereby to impart intermittent lengthwise forward movement to said carriage, means operatively coupling said ratchet device with the said reciprocatory transverse movement imparting means, and means associated with said frame for clamping the same below the plane of movement of said saw to said element when horizontally straddled by said frame.

7. In a machine for sawing off an element such as a sheet piling below the water level, the combination with a frame being U-shaped in horizontal section, of guide ways secured to and extending in substantially parallel relation with the legs of said U, a carriage adapted for lengthwise movement along said guide ways, a saw associated with said carriage but adapted to move in transverse direction relative thereto, means for imparting to said saw reciprocatory transverse movement relative to said carriage, a feed screw associated with said frame and extending in parallel relation with said guide ways, means normally preventing said feed screw from rotation, a nut in operative engagement with said feed screw and engaging said carriage, a ratchet wheel secured to said nut, a member adapted for swinging motion about the axis of said feed screw, means associated with said reciprocatory transverse movement imparting means and adapted to impart swinging motion to said member, two ratchet pawls hinged to said member and adapted during swinging movement of said member to engage said ratchet wheel and impart thereto rotary motion the one pawl in forward and the other pawl in backward direction, a third ratchet pawl hinged to said carriage and adapted when engaging said ratchet wheel to prevent the same from rotation in backward direction, means interconnecting said third ratchet pawl with said backward rotary motion imparting ratchet pawl in such a manner that when the one engages the said ratchet wheel the other disengages the same and vice versa, means located in the path of said backward rotary motion imparting ratchet pawl and adapted to move same out of engagement with said ratchet wheel before said pawl has reached the end of its idle stroke, and means associated with said frame for clamping the same below the plane of movement of said saw to said element when horizontally straddled by said frame.

8. In a machine for sawing off an element such as a sheet piling below the water level, the combination with a frame being U-shaped in horizontal section, of guide ways secured to and extending in substantially parallel relation with the legs of said U, a carriage adapted for lengthwise movement along said guide ways, a saw bow associated with said carriage but adapted to move in transverse direction relative thereto, a saw blade extending across the space between the legs of said U and having one of its ends secured to one leg of said saw bow, an arm associated with and adapted for substantially horizontal swinging movement relative to the other leg of said bow and connected to the other end of said saw blade, a feed screw associated with said frame and extending in parallel relation with said guide ways, means normally preventing said feed screw from rotation, a nut in operative engagement with said feed screw and engaging said carriage, a ratchet wheel secured to said nut, a member adapted for swinging motion about the axis of said feed screw, means associated with said reciprocatory transverse movement imparting means and adapted to impart swinging motion to said member, two ratchet pawls hinged to said member and adapted during swinging movement of said member to engage said ratchet wheel and impart thereto rotary motion the one pawl in forward and the other pawl in backward direction, a third ratchet pawl hinged to said carriage and adapted when engaging said ratchet wheel to prevent the same from rotation in backward direction, means interconnecting said third ratchet pawl with said backward rotary motion imparting ratchet pawl in such a manner that when the one engages the said ratchet wheel the other disengages the same and vice versa, a pin normally located in the path of said backward rotary motion imparting ratchet pawl and adapted to move same out of engagement with said ratchet wheel before said pawl has reached the end of its idle stroke, a hook member associated with said pin, a second hook member associated with said arm and adapted on excessive backward yielding movement of said saw blade to operatively engage the first said hook member during the reciprocatory transverse movement of said saw bow so as to move said pin out of said path, and means associated with said frame for clamping the same below the plane of movement of said saw to said element when horizontally straddled by said frame.

9. In a machine for sawing off an element such as a sheet piling below the water level, the combination with a structure comprising an upper frame and a lower frame suitably braced together and being U-shaped in horizontal section, of guide ways secured to and extending in substantially parallel relation with the legs of the said lower frame, a carriage adapted for lengthwise movement along said guide ways, means for imparting lengthwise forward movement to said carriage, a saw associated with said carriage but adapted to move in transverse direction relative thereto, driving gear mounted on said upper frame, mechanism mounted on said lower frame for imparting reciprocatory transverse movement to said saw relative to said carriage, a substantially vertical spindle containing a universal joint for transmitting motion from said driving gear to said mechanism, and means associated with said frame for clamping the same below the plane of movement of said saw to said element when horizontally straddled by said frame.

10. In a machine for sawing off an element such as a sheet piling below the water level, the combination with a frame being U-shaped in horizontal section, of parallel guide ways secured to the legs of said U but sloping in forward direction, a carriage adapted for lengthwise movement along said guide ways, means for imparting lengthwise forward movement to said carriage, a saw associated with said carriage but adapted to move in transverse direction relative thereto, means for imparting to said saw reciprocatory transverse movement relative to said carriage means for vertically moving said saw relative to said carriage, and means associated with said frame for clamping the same below the plane of movement of said saw to said element when horizontally straddled by said frame.

In testimony whereof I affix my signature.
JACOBUS GROENEVELD DE KATER.